United States Patent [19]
Moore

[11] Patent Number: 5,495,755
[45] Date of Patent: Mar. 5, 1996

[54] SLICK LINE SYSTEM WITH REAL-TIME SURFACE DISPLAY

[76] Inventor: Boyd B. Moore, 427 Mignon, Houston, Tex. 77024

[21] Appl. No.: 101,321

[22] Filed: Aug. 2, 1993

[51] Int. Cl.⁶ .............................. E21B 34/10; H01R 4/64
[52] U.S. Cl. ................... 73/152; 166/254.2; 340/856.3; 340/853.1; 324/357
[58] Field of Search .................. 73/152, 151; 340/853.1, 340/855.2; 166/241.5; 324/357

[56] References Cited

U.S. PATENT DOCUMENTS

| | | |
|---|---|---|
| 1,523,629 | 1/1925 | Bullock . |
| 1,998,826 | 4/1935 | Wentz . |
| 2,018,477 | 10/1935 | Wentz ........................................ 174/29 |
| 2,357,906 | 9/1944 | Osterheld ............................. 174/126.1 |
| 2,950,454 | 8/1960 | Unger ....................................... 333/242 |
| 3,016,503 | 1/1962 | Pierce ...................................... 333/242 |
| 3,265,803 | 8/1966 | Grove . |
| 3,285,629 | 11/1966 | Cullen et al. ........................... 166/65.1 |
| 3,356,790 | 12/1967 | Polizzano et al. . |
| 3,443,429 | 5/1969 | Terwilliger et al. . |
| 3,916,685 | 11/1975 | Paap et al. .................................. 73/152 |
| 4,038,519 | 7/1977 | Foucras ..................................... 219/301 |
| 4,071,834 | 1/1978 | Comte ......................................... 174/47 |
| 4,095,865 | 6/1978 | Denison et al. ........................ 339/16 R |
| 4,121,193 | 10/1978 | Denison ...................................... 340/18 |
| 4,137,762 | 2/1979 | Smith ......................................... 73/151 |
| 4,220,381 | 9/1980 | van der Graaf ............................. 339/16 |
| 4,315,099 | 2/1982 | Gerardot ..................................... 174/47 |
| 4,346,256 | 8/1982 | Hubbard et al. ............................. 174/47 |
| 4,368,348 | 1/1983 | Eichelberger et al. ..................... 174/47 |
| 4,415,895 | 11/1983 | Flagg ........................................ 340/856 |
| 4,416,494 | 11/1983 | Watkins et al. ............................. 339/15 |
| 4,552,432 | 11/1985 | Anderson et al. ..................... 350/96.23 |
| 4,554,650 | 11/1985 | Brown et al. ............................. 367/154 |
| 4,681,169 | 7/1987 | Brookbank, III ........................ 166/385 |
| 4,792,802 | 12/1988 | Meadows .................................. 340/856 |
| 4,842,064 | 6/1989 | Gazda ....................................... 166/250 |
| 5,080,175 | 1/1992 | Williams .................................. 166/385 |
| 5,122,209 | 6/1992 | Moore et al. ................................ 156/54 |
| 5,140,318 | 8/1992 | Stiner ..................................... 340/854.8 |
| 5,234,058 | 8/1993 | Sas-Jaworski et al. ................. 166/385 |
| 5,294,923 | 3/1994 | Juergens et al. ...................... 340/854.9 |
| 5,329,811 | 7/1994 | Schultz et al. ............................ 73/155 |

Primary Examiner—Hezron E. Williams
Assistant Examiner—J. David Wiggins
Attorney, Agent, or Firm—Pravel, Hewitt, Kimball & Kriger

[57] ABSTRACT

An apparatus and method is provided whereby a small diameter, single conductor wireline is combined with standard slick line equipment to obtain "real-time" surface display from well logging tools. A helically formed, insulated conductor coextending within a conductive tube functionally replaces standard solid wire for lowering tools down into a wellbore and for transmitting tool-generated signals to a surface-located display.

18 Claims, 4 Drawing Sheets

SLICK LINE SYSTEM WITH REAL-TIME SURFACE DISPLAY

FIELD OF THE INVENTION

The invention relates to an apparatus and method for applying a conventional slick line assembly and a single conductor wireline in combination to obtain "real-time" surface display from well logging tools.

BACKGROUND OF THE INVENTION

Measuring instruments or tools are commonly lowered down a wellbore and located in a subterranean reservoir to measure formation characteristics such as bottom hole pressures and temperatures as a function of time. These instruments are available in "memory" type and "real-time" type configurations.

The "memory" type tools are conventionally lowered through a tubing string positioned in a wellbore on a ⅛" diameter solid wire called a wireline. This economical and successful procedure and its associated equipment is known as a slick line system and is used mainly for bottom hole pressure testing. These "memory" type tools remain downhole recording data onto a downhole chart for a finite time period. The tool is then retrieved to ascertain the measured data accumulated over the entire period.

The slick line system is popular due to its minimum equipment requirements and its ease of use.

Applied to a known well or reservoir, the operator of the slick line system can usually estimate the length of time required for the tool to remain downhole and obtain the desired data. If, however, the tool is retrieved prematurely, the data could be incomplete and therefore of questionable value. Conversely, valuable time is lost and needless expense incurred if the tool is left downhole longer than necessary. For example, in the case of a pressure drawdown/build-up test, the tool may be left in the well for a number of days with the expectation that the pressure build-up will have stabilized by the time the tool is recovered—however stabilization may not yet have been achieved.

To date, the slick line systems have been limited to use with "memory" type tools, as a compatible wireline has not been available for transmitting signals generated by "real-time" type logging tools to the surface.

"Real-time" type tools both avoid the time uncertainties of the "memory" type tools and supply the operators with data at the surface as it is generated. Signals are generated at the reservoir-located tool and are transmitted up a conductive wireline to a surface-located data acquisition system. The wireline is generally comprised of a single conductor and is implemented a variety of forms requiring various degrees of specialized equipment not in common with the slick line system.

One form of the conductive wireline is a ¼" tube within which is located a single, solid electrical conductor. The conductor is typically bonded within the bore of the tubing with epoxy or teflon, thereby insulating the conductor therefrom. The tubing extends through the wellhead and into the wellbore. The tubing is strapped to the outside of the tubing string and extends downwards to the tool which is typically mounted to the bottom of the tubing string. The bonded tube, conductor and epoxy insulation are unforgiving with respect to flexing or thermal exposure and are particularly prone to damage.

Flexing occurs whenever the ¼" conductive wireline is installed or removed. The wireline is usually spooled onto a large diameter (>6 foot diameter) drum. When coiled, each of the tubing, the insulation, and the conductor components are laying at differing physical lengths of circumference. This varying pitch results in differential movement of each component and repeated deformation. Similarly, differential thermal expansion and relative movement occurs when the tubing changes temperature with respect to the conductor. Multiple use and re-use of the wireline results in eventual failure of the conductor, the insulation or both, resulting in permanent damage to the wireline. For these reasons, handling of the tubing, or differential thermal expansion experienced in the wellbore often result in irreparable damage to the expensive assembly.

An alternate arrangement for a "real-time" tubing and conductor assembly is as described in U.S. Pat. No. 5,122,209, issued to Moore. A plurality of insulated conductors are helically coiled and simultaneously installed within ¼" tubing during its manufacture. Thus the tubing and the conductors are not bonded together to form a solid unit. This arrangement ameliorates much of the differential movement difficulties of the previous bonded tubing/conductor/epoxy assembly. Friction between the conductor's helical coils and the tubing restricts free movement within the tubing, yet the conductors can extend, contract and shift to accommodate variable pitch when spooled and to relieve some of the thermal effects. The tool and wireline are again secured to the outside surface of the tubing string, which must be tripped out of the well to recover the tool.

Both of the ¼" tubing and conductor wirelines are generally used in permanent installations. Each of them require tripping of the tubing string to repair or change the tool. The production delay or suspension of a well operation to trip tubing from a well can be expensive. Further, a rig is required at the well to effect the removal of the tubing string, Still further, significantly larger scale wireline spool and associated equipment is required, than is used in the slick line system.

In yet another form of wireline, one or more insulated conductors are contained within a flexible and conductive braided outer sheath. The braided wireline and an attached tool can be run into and removed from the bore of a tubing string without requiring the removal of the tubing string. Braided wirelines of diameters less than 3/16" (for one conductor) are not known to the inventor.

In the braided wireline embodiment, the tool is introduced to the tubing string through an isolating lubricator mounted at the wellhead. The braided wireline requires significant effort and specialized equipment to seal it at the lubricator. Typically an extra person is required, dedicated to managing a pressurized grease sealing system. The braiding conforms in length to the conductor length, being more robust and suited to multiple use than are the ¼" tubing and conductor assemblies. The braiding is expensive however, and due to the high surface area and the braid's tendency for corrosion, expensive and exotic materials are required when used for sour ($H_2S$) service. The need for increased labor and specialized equipment and the very high unit length cost of the braided conductors limits use of this system primarily to production logging.

In summary, none of the prior art wirelines are amenable to being used with existing slick line equipment in "real-time" testing applications. The braided wireline is generally too expensive for use in other than production logging and requires specialized equipment not available with the existing slick line systems. The ¼" wirelines suffer the following incompatibilities for use with the slick line system: the wireline diameter is too large and too inflexible for spooling onto conventional slick line drums; the wireline is too inflexible to be drawn down into the well under the weight of the attached tools alone, therefore requiring specialized draw-works; and the wireline requires a larger guiding sheave and packing seal at the lubricator.

An object of the present invention, therefore, is to provide a conductive wireline amenable for use with conventional slick line equipment currently in popular and widespread use, for obtaining "real-time" surface readout for both bottom hole pressure testing and production logging applications.

SUMMARY OF INVENTION

In accordance with the invention, the wireline described in Moore's U.S. Pat. No. 5,122,209 is provided in a small diameter and flexible form so that it may be used in conjunction with conventional slick line equipment to provide means for running a logging tool through the completion string of a well to measure a subterranean formation characteristic (such as reservoir pressure or resistivity) and provide a "real-time" surface display thereof.

In a preferred embodiment, by utilizing a continuous stainless steel tube having an outside diameter of about ⅛" and a wall thickness of about 0.022 inches, a conductive tubing is provided that can function as a conductor in the tool circuit and can bear the weight of the tool, yet is also sufficiently flexible to be used with a slick line drum and passed through a slick line lubricator without permanent deformation. By providing a helically coiled, electrically and thermally insulated, conductive wire, having a diameter significantly less than the bore of the tube, to extend coextensively through the bore of the tube, there is provided a conductor that will resist straightening and thus will not break due to its own weight and which can independently elongate and contract and move laterally to accommodate thermal and spooling effects without breakage or shorting.

Broadly stated then, the invention in one aspect is a slick line assembly for logging subterranean formation characteristics in conjunction with a well having a wellhead and containing a completion string-having an axial bore, comprising: a slick line lubricator mounted on the wellhead; a driven slick line drum positioned adjacent the well and carrying a wireline extending through the lubricator into the bore of the completion string; said wireline comprising an electrically conductive metal tube forming an internal longitudinal bore, said tube having an outside diameter of about ⅛" inch and being sufficiently flexible to be used with the drum and lubricator without being permanently deformed, and a helically formed, multiple strand, thermally and electrically insulated conductor extending through the tube bore and being coextensive with and in frictional contact with the tube wall, said conductor having a diameter smaller than that of the tube bore and being free to move axially therewithin except as restrained by the frictional contact; a formation characteristic measuring tool attached to the bottom of the wireline and being operatively connected with the tube and conductor to form a circuit, said tool being positioned in the completion string bore for raising and lowering therethrough, said tool being adapted, when energized, to emit signals indicative of the formation characteristic; a power source for energizing the circuit; and means at ground surface for receiving the emitted signals and producing a display thereof.

In another broad aspect, the invention comprises a method for logging a subterranean formation characteristic in conjunction with a well, said well having a wellhead, a completion string having an axial bore, and a slick line lubricator mounted on the wellhead, said well further having a driven slick line drum associated with it for feeding wireline into the completion string through the lubricator and withdrawing it, comprising:

providing a flexible wireline comprising an electrically conductive metal tube, having an outside diameter of about ⅛ inch and forming an internal longitudinal bore, and a thermally and electrically insulated conductive wire extending through the tube bore, said wireline being spooled on the drum and extending through the lubricator into the completion string bore; providing a formation characteristic measuring tool in the completion string bore, said tool being attached to the lower end of the wireline and being operatively connected with the tube and wire so that a circuit is formed for energizing the tool to cause it to emit signals indicative of the formation characteristic and transmit the signals to ground surface; providing a power source for energizing the circuit; providing means at ground surface for recording signals emitted by the tool; lowering the tool through the completion string bore on the wireline to traverse the formation; energizing the circuit when opposite the formation to cause transmittal through the wireline of signals indicative of the formation characteristic; recording the transmitted signals; and withdrawing the wireline and tool from the well by spooling the wireline onto the drum and recovering the tool in the lubricator.

DETAILED DESCRIPTION OF THE PREFERRED EMBODIMENT

Figures 1, 2:
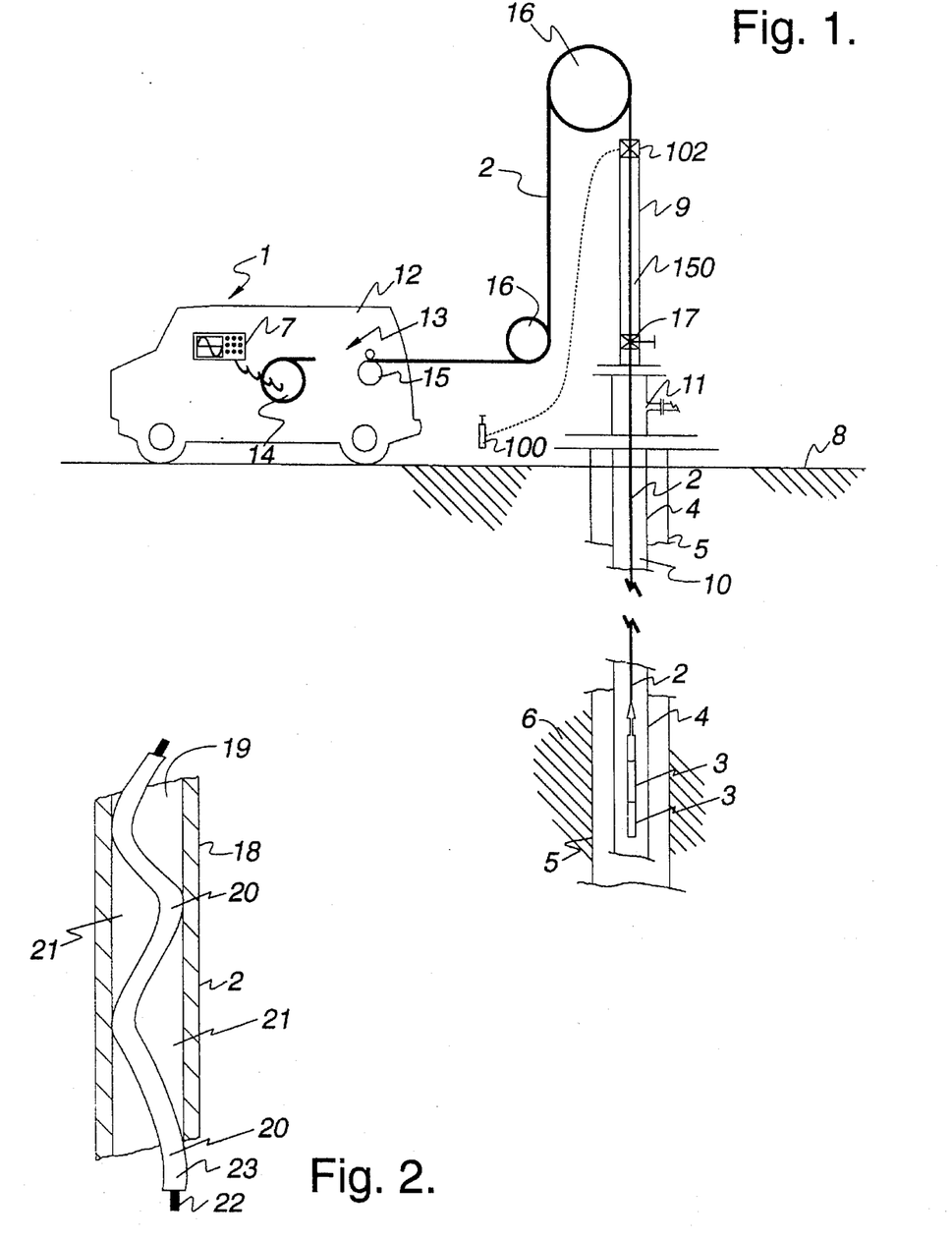
FIG. 1 is a schematic representation of the slick line assembly and wireline of the present invention, the well and a logging tool located in the formation.
FIG. 2 is a cross-sectional view of the wireline.

Referring to FIG. 1, a slick line assembly 1 is provided comprising a wireline 2 for supporting a logging tool 3 in a well 5 extending into a subterranean formation 6.

The well 5 comprises a tubing or completion string 4 having an axial bore 10. A wellhead 11 is located at the top of the completion string 4 at ground surface 8. The slick line assembly 1 further comprises a driven drum 14 of the size and type conventionally used with 0.125–0.092 inch solid wireline. The wireline 2 is spooled on the drum 14 and extends through rollers 15 and over sheaves 16 to the top of a lubricator 9.

The lubricator 9 enables the tool 3 and the wireline 2 to be inserted and removed from the well 5. More particularly, the lubricator 9 forms an upstanding tubular chamber 150 with an isolating valve 17, at its lower end, attached to the existing wellhead 11, and a packing 102 at its upper end. The wireline 2 extends through the packing 102, through the lubricator 9 and into the bore 10 of the tubing string 4. A small hydraulic pump 100 pressurizes the packing 102, enabling it to seal around the wireline 2.

As seen in FIG. 2, the wireline 2 comprises a ⅛" outside diameter, electrically conductive tube 18 formed of stainless steel and having a wall thickness of 0.022 inches. The tube 18 forms an internal longitudinal bore 19. A single insulated conductor 20 extends coextensively through the bore 19. The conductor 20 is of smaller cross-section than the bore 19 so that an annular space 21 is formed between the insulated conductor 20 and the tube 18.

Thus, two conductive paths 18, 20 are provided, being suitable for transmitting signals from conventional "real-time" logging tools.

Standard wireline is referred to in the industry as having a single conductor (the insulated conductor 20), the second ground path (the tube 18) being presupposed.

The insulated conductor 20 is made from stranded 20 gauge silver plated copper wire 22 per ASTM standard B298-74A. The conductor has a two part insulation covering 23. The primary insulation is provided by two polymide tapes ("Capton" supplied by Dupont) contrahellically applied to the wire with a minimum 50% overlap on each wrap. A secondary topcoat of aromatic polymide resin is applied to seal the tape and improve durability. The diameter of the overall finished conductor 20 is about 0.055"±0.002".

The wireline 2 is first formed by installing the insulated conductor into a ¼" tube using a method described in detail in U.S. Pat. No. 5,122,209 issued to Moore. A strip of flat material is formed into the tube whilst simultaneously feeding the insulated conductor 20 thereinto. The insulated conductor 20 is specifically protected during the welding procedure used to seal the longitudinal seam of the tube.

The tube 18 can be made from stainless steel, or INCCLOY 825 (Huntington Alloys, Huntington, W.V.). These alloys can be used in $H_2S$ service applications due to the non-trapping, clean outer surface of the tube.

The insulated conductor 20 is provided in a helically coiled condition. The insulated conductor 20 is coextensive with and in frictional contact with the inside wall of the tube 18. This contact enables relatively free longitudinal movement to occur between the tube 18 and the conductor 20 as a result of differential thermal growth, yet it frictionally restrains the conductor from straightening and dropping to the bottom of the tubing under gravity loading. Lengths of insulated conductor 20 as long as 20,000 feet can thus be provided within small diameter tube 18.

The ¼" assembly of tube and conductor 18, 20 is mechanically drawn to a ⅛" diameter with about a 0.022" wall for use with the slick line assembly 1.

Gibson Tube of Bridgewater, N.J. has tested a suitable drawing technique for this purpose and is commercially supplying ⅛" diameter tube containing the helically coiled conductor.

Figure 3:
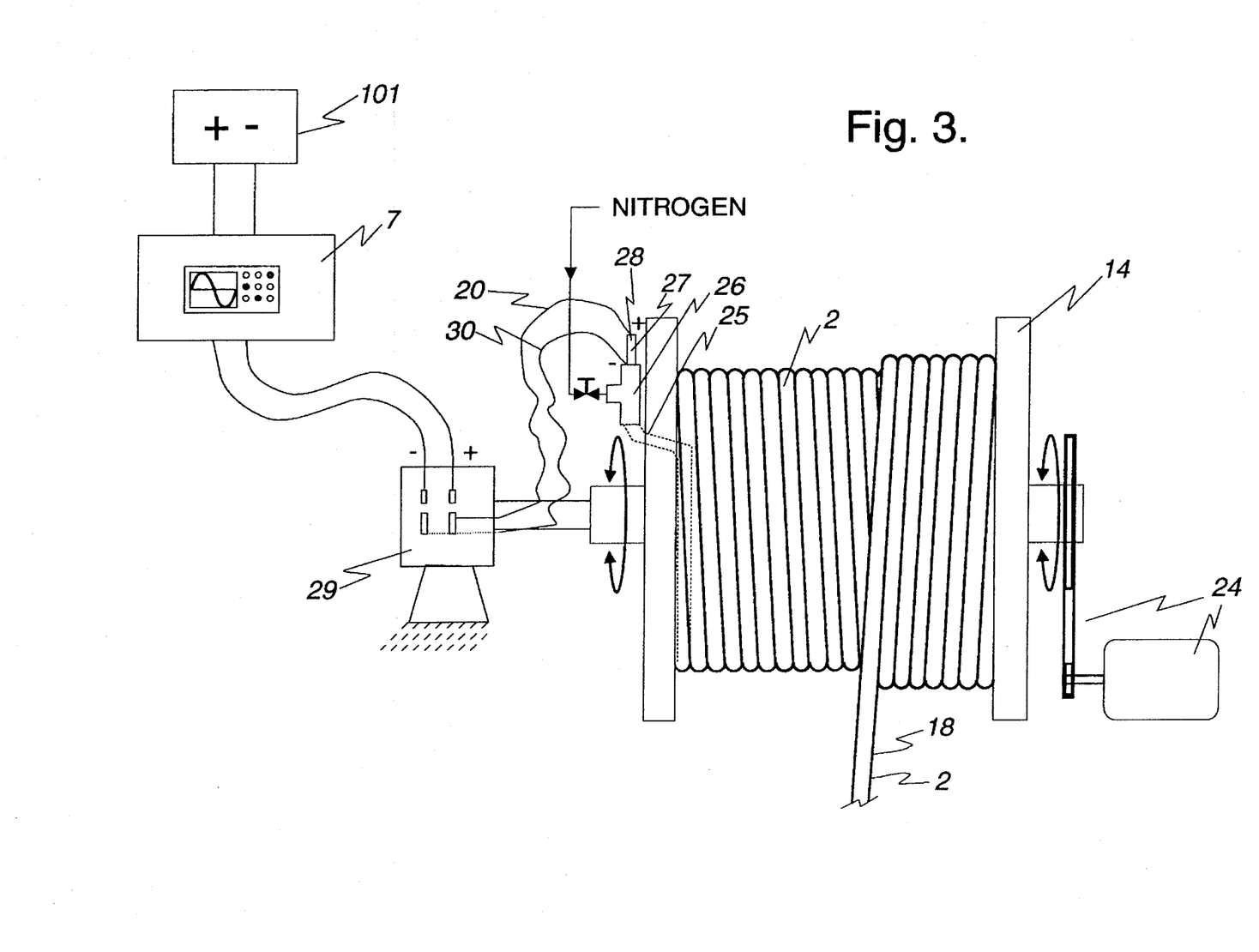
FIG. 3 is a schematic plan view of the wireline drum and surface connection of the wireline.

Having reference to FIG. 3, the wireline 2 is spooled onto the drum 14. The drum 14 is driven with a hydraulic drive and transmission means 24. The surface end 25 of the wireline projects from the drum 14 and terminates with a compression fitting to a tubing tee connection 26. A connector tube 27 is connected to the tee 26 and ends with a hermetic seal 28 threaded thereinto, as detailed in FIG. 4. The hermetic seal 28 enables the insulated conductor 20 to pass straight through and out of the tee 26 while sealing the annular space 21. The stem of the tee 26 is fitted with a valve means 99 and, when opened, it permits the annular space 21 of the wireline 2 to be pressurized, preferably with nitrogen. This enables neutralizing downhole pressure, thereby preventing the tube 18 from being crushed or otherwise damaged. The insulated conductor 20 is then directed back to the axis of the drum 14 to a commercial connector ring assembly 29 such as that available from IEC Corporation, Austin, Texas, Model IEC-2-GO. A ground wire 30 is electrically connected to the tee 26 and is similarly directed to the connector ring assembly 29. The connector ring assembly 29 establishes electrical connection from the insulated conductor 20 and ground wire 30, which rotate with the drum 14, to a non-rotating power lead 31 connected with the insulated conductor 20 and to a non-rotating ground lead 32 connected with the conductive tube 18. The leads 31, 32 complete an electrical circuit with the logging tools 3 and enable the transmission of generated signals to the recording and display means 7 at ground surface 8.

The recording and display means 7 is a conventional data acquisition system which is matched to the logging tool 3.

A power source 101 is provided for energizing the circuit and enabling the tool 3 to generate signals indicative of the formation characteristic for which it is designed. The power source 101 is matched to the logging tool 3. For example, Computalog, of Fort Worth, Texas supplies matching logging tools, power sources (typically 300 V) and display means.

Figures 5, 6, 7:
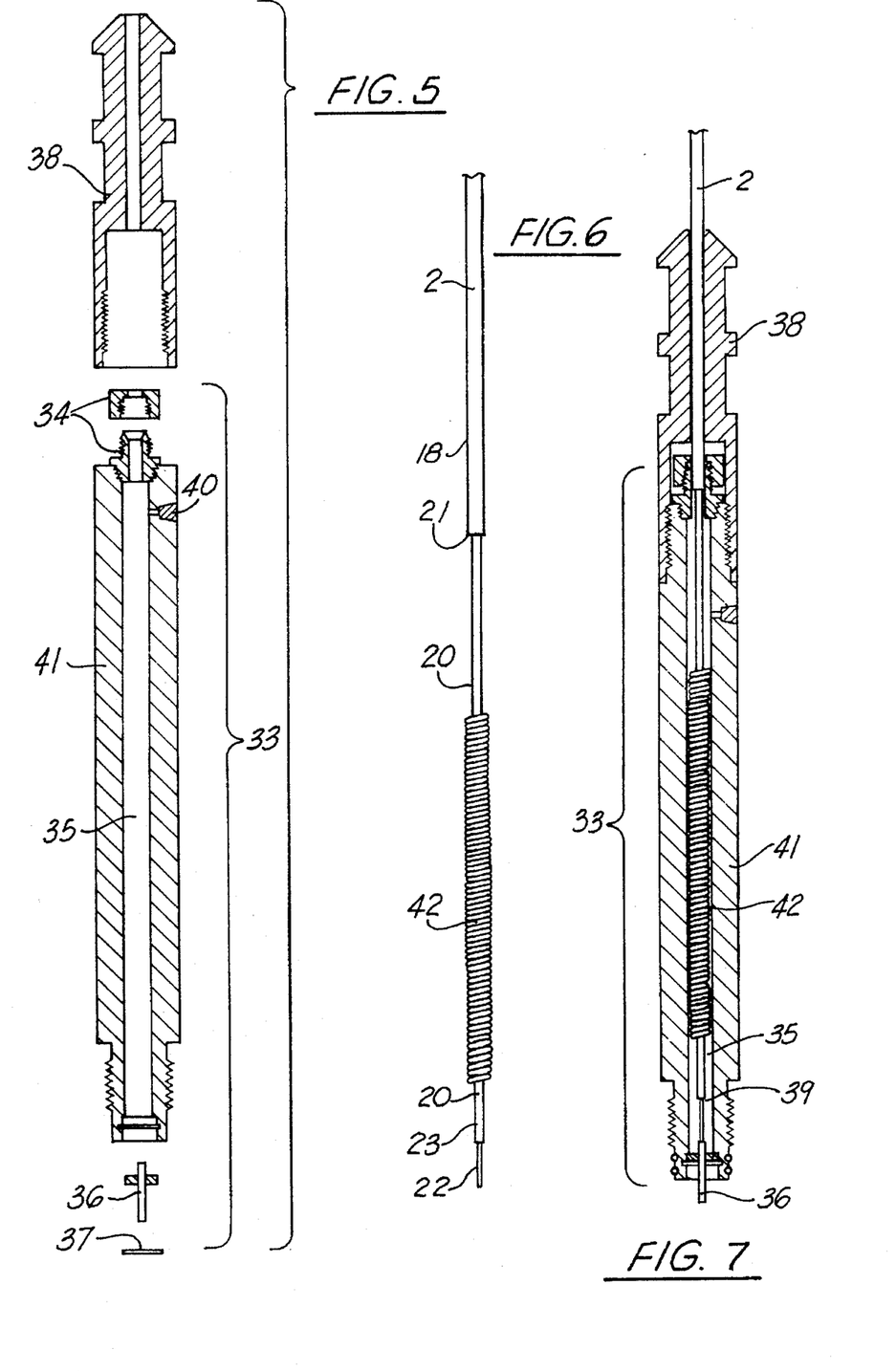
FIG. 5 is an exploded, cross-sectional view of the cable head adapter and fishneck.
FIG. 6 is a view of the end of the wireline tube and the protruding tightly coiled portion of the wire for connection to the cable head adapter.
FIG. 7 is an assembled view of the cable head adapter, combined from the components as depicted in FIGS. 5 and 6.

Referring now to FIGS. 5, 6, and 7, the wireline 2 is terminated at the logging tool end with a cable head adapter 33 suited for connection, with threads, to the logging tool 3 (not shown). The cable head adapter 33 comprises a metal body 41, connected to the wireline 2 at its top end with a compression fitting 34. The adapter body 41 is hollow, forming a bore 35 into which the insulated conductor 20 extends from the wireline 2. The conductor 20 is electrically connected to a plug 36 which is adapted for electrical connection with the logging tool 3. The adapter body 41 electrically grounds to the tool. The plug 36 is detachably secured to the bottom end of the adapter body 41 with a mechanical retaining means 37. A fishneck 38 is attached to the top of the adapter 33 to facilitate retrieval of the tool 3 if lost down the well 5.

During fast running in, or lowering of the wireline 2 into the tubing string 4, the tube 18 can elongate, due to thermal effects, at a faster rate than the conductor 20. In extreme conditions the conductor 20 could be drawn completely within the tube 18, straining and breaking the connection to the plug 36. Therefore, approximately 5 feet of the bottom of the, insulated conductor 20 is formed into a tight coil 42 about 6" in length, which provides an excess length of conductor and enables the conductor 20 to remain coextensive with the tube 18.

The wireline annulus 21 is left open to the inside bore 35 of the adapter 33, which is filled with a non-conductive fluid 39, such as that used in electrical transformers, injected through a side port 40. Should a leak occur in the wireline 2, oil or water is unable to displace the heavy non-conductive fluid 39 and adversely affect the "electrical connection at the plug 36." In this way, a leak will not force a premature end to the testing. Once a test is complete, the leak can be repaired and the annular space 21 blown clear and dried out with nitrogen without permanent damage.

Figure 4:
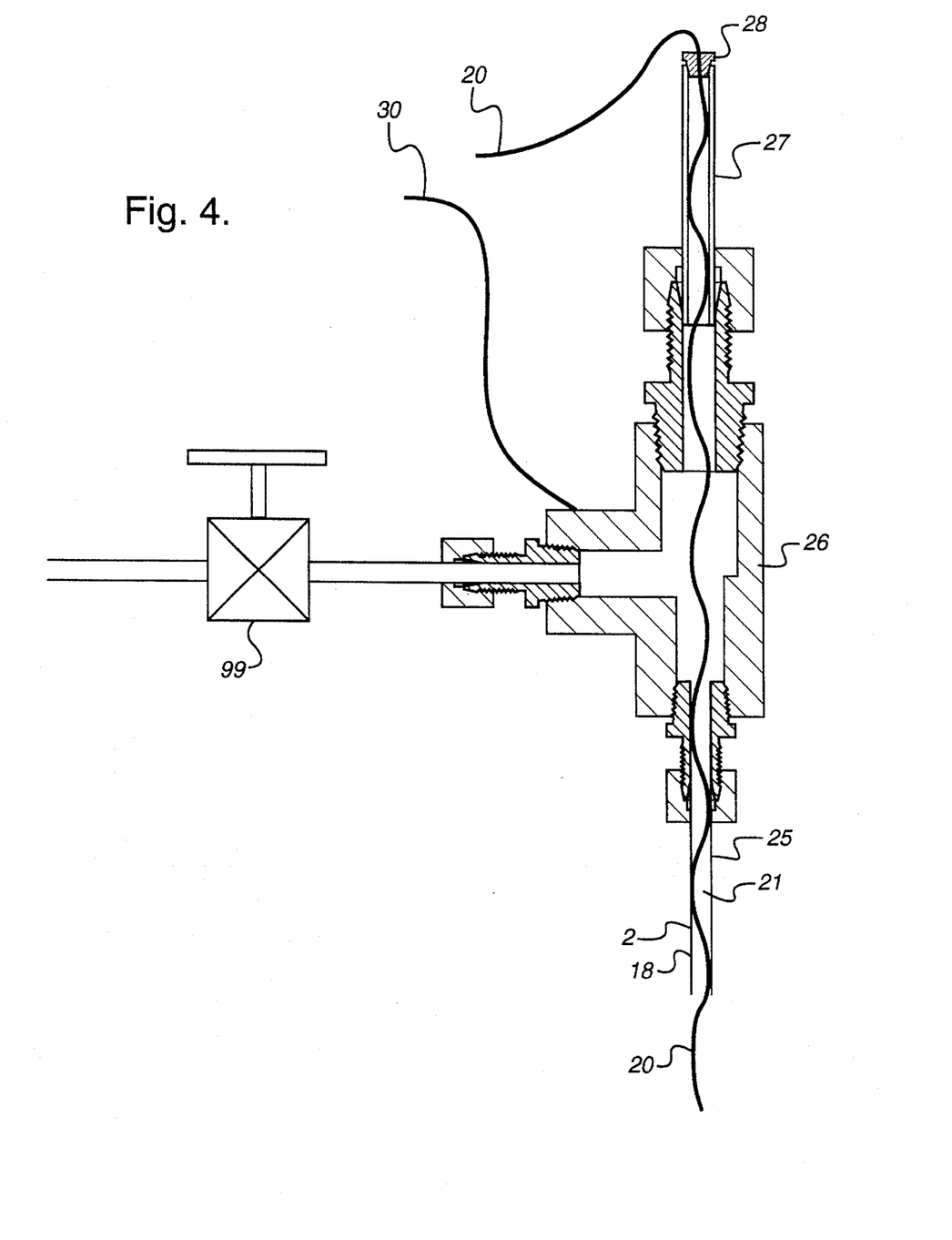
FIG. 4 is a cross-sectional view of the surface "Tee" junction for annular termination and pressurization.

The wireline 2 can be readily pressure tested with nitrogen prior to each use by using the valve means 99 and tee 36. Leaks can be detected using a water bath and bubble technique and repaired by soldering.

In preparation for logging characteristics of the subterranean formation 6, the slick line assembly 1 and its wireline 2 are positioned adjacent the well 5 and a length of wireline is unspooled from the drum.

To prepare the wireline 2 and connect it to the logging tool 3, about 5 feet of tube 18 is trimmed from the bottom end of the wireline leaving the insulated conductor 20 projecting therefrom. The tube 18 and conductor 20 are threaded through the packing 102 at the lubricator 9, the fishneck 38, the compression fitting 34, and through the cable head adapter 33. The excess insulated conductor 20 is tightly coiled and the wire 22 is connected to the plug 36. The coil 42 is tucked into the adapter body 41. The plug 36 is secured to the body 41 at its bottom end. The compression fitting 34 is tightened and non-conductive fluid 39 is introduced to the now sealed adapter cavity 35. The fishneck 38 is tightened to the cable head adapter 33.

The logging tool 3 is connected to the cable head adapter 33. The wireline and tool assembly 2, 3 is installed into the lubricator 9 and the packing 102 secured thereto. The hydraulic pump 100 seals the packing around the wireline and the isolating valve 17 is opened to the tubing string 4. Note that this may be accomplished without interfering with the production or other operation of the well.

If the pressure in the well is high, valve means 99 is opened and the annulus 21 of the wireline 2 is pressurized from a nitrogen source. The valve means 99 is closed, the nitrogen source is removed, and the drum 14 is freed for rotation.

The tool 3 is lowered through the bore 10 of the completion string 4 by unspooling the wireline 2 from the drum to traverse the formation 6. The weight of the attached tool is sufficient to draw the wireline down with the tool. The circuit is energized when the tool is opposite the formation or portion of the well of interest.

The logging tool 3 measures the particular characteristics of the formation 6 for which it is designed and emits signals indicative of the measurements, which signals are transmitted through the wireline 2. The recording and receiving means 7 at the ground surface receives and records the signals from the wireline 2. Upon conclusion of the test, the wireline 2 and attached tool 3 are withdrawn from the well 4 by spooling the wireline 2 onto the drum 14 to raise the tool for recovery in the lubricator 9.

The invention has been found to be characterized by the following advantages:

the insulation and wire are not damaged by thermal effects, spooling and flexing;

for the first time, conventional slick line equipment has been used with "real-time" logging through the tubing string or other completion string;

bottom hole pressure testing can now be carded out without the difficulties of withdrawing the tool too soon or leaving it in the well longer than necessary;

slick line systems can now be applied to production logging on a "real-time" basis;

slick line wireline formed of relatively low cost alloy can now be used in corrosive wells without incurring the high cost of braided wireline; and logging costs can be reduced.

The embodiments of the invention in which an exclusive property or privilege is claimed are defined as follows:

1. A slick line assembly for logging subterranean formation characteristics in conjunction with a well having a wellhead and containing a completion string having an axial bore, comprising:

a slick line lubricator mounted on the wellhead;

a driven slick line drum positioned adjacent the well and carrying a wireline extending through the lubricator into the bore of the completion string;

said wireline comprising an electrically conductive metal tube forming an internal longitudinal bore, said metal tube having a welded seam and having an outside diameter of about ⅛ inch and a wall thickness selected to have a value substantially equal to 0.022 inch to form a tube sufficiently flexible to be coiled on the slick line drum and to be used with the lubricator without being permanently deformed, and a helically formed, multiple strand, thermally and electrically insulated electrical conductor extending through the tube bore and being coextensive with and in frictional contact with the tube wall, said insulated conductor having a diameter smaller than that of the tube bore and being free to move axially therewithin except as restrained by the frictional contact;

a formation characteristic measuring tool attached to the bottom of the wireline and being operatively connected with the metal tube and insulated conductor to form a circuit, said tool being positioned in the completion string bore for raising and lowering therethrough, said tool being adapted, when energized, to emit signals indicative of the formation characteristic;

a power source for energizing the circuit; and means at ground surface for receiving the emitted signals and producing a display thereof.

2. The assembly as set forth in claim 1 wherein:

the insulated conductor at its bottom end is relatively tightly coiled to provide an excess length for enabling the conductor to remain coextensive with the tube should the tube elongate more than the conductor due to thermal effects.

3. The assembly as set forth in claim 1 comprising:

means at ground surface for pressurizing the bore of the metal tube to at least partly equalize the pressure in the bore with the pressure external of the tube.

4. The assembly as set forth in claim 2 comprising:

means at ground surface for pressurizing the bore of the metal tube to at least partly equalize the pressure in the bore with the pressure external of the tube.

5. The assembly as set forth in claim 1 wherein the metal tube has a wall thickness of about 0.022 inches.

6. The assembly as set forth in claim 3 wherein the metal tube has a wall thickness of about 0.022 inches.

7. The assembly as set forth in claim 4 wherein the metal tube has a wall thickness of about 0.022 inches.

8. A method for logging a subterranean formation characteristic in conjunction with a well, said well having a wellhead, a completion string having an axial bore, and a slick line lubricator mounted on the wellhead, said well further having a driven slick line drum associated with it for feeding wireline into the completion string through the lubricator and withdrawing it, comprising:

providing a flexible wireline comprising an electrically conductive metal tube, having a welded seam and having an outside diameter of about ⅛ inch and a wall thickness selected to have a value substantially equal to 0.022 inch to form a tube sufficiently flexible to coil on the slick line drum, the metal tube forming an internal longitudinal bore having an inner diameter, and a thermally and electrically insulated conductive wire having a diameter extending through the tube bore, said inner diameter being greater than said insulated conductive wire diameter such that an annular space is formed between the metal tube and the insulated conductive wire, said wireline being spooled on the drum and extending through the lubricator into the completion string bore;

providing a formation characteristic measuring tool in the completion string bore, said tool being attached to the lower end of the wireline and being operatively connected with the metal tube and insulated conductive wire so that a circuit is formed for energizing the tool to cause it to emit signals indicative of the formation characteristic and transmit the signals to ground surface;

providing a power source for energizing the circuit;

providing means at ground surface for recording signals emitted by the tool;

lowering the tool through the completion string bore on the wireline to traverse the formation;

energizing the circuit when opposite the formation to cause transmittal through the wireline of signals indicative of the formation characteristics;

recording the transmitted signals; and withdrawing the wireline and tool from the well by spooling the wireline onto the drum and recovering the tool in the lubricator.

9. A method for logging a subterranean formation characteristic in conjunction with a well, said well having a wellhead, a tubing string having an axial bore, and a slick line lubricator mounted on the wellhead, said well further having a driven slick line drum associated with it for feeding wireline into the tubing string bore through the lubricator and withdrawing it, comprising:

providing a formation characteristic measuring tool that is adapted, when downhole opposite the formation and energized, to emit signals indicative of the formation characteristic;

providing a wireline comprising an electrically conductive metal tube forming an internal longitudinal bore, said tube having an outside diameter of about ⅛ inch and being sufficiently flexible to be used with the drum and lubricator without being permanently deformed, and a helically formed, multiple strand, thermally and electrically insulated, conductive wire extending through the tube bore, said insulated conductive wire being in frictional contact with the tube wall, said insulated conductive wire having a diameter substantially smaller than that of the tube bore so that the insulated conductive wire is free to move axially and laterally within the bore except as restrained by the frictional contact, said wireline having an outside diameter of about ⅛ inch, said wireline being spooled on the drum and extending through the lubricator and into the tubing string bore, said metal tube and insulated conductive wire being operatively connected at their lower ends with the tool to form a circuit;

providing a power source at ground surface for energizing the circuit;

providing means at ground surface for recording signals emitted by the tool;

lowering the tool through the tubing string bore on the wireline to traverse the formation;

energizing the circuit while opposite the formation to cause transmittal through the wireline of signals indicative of the magnitude of the formation characteristic;

recording the transmitted signals at ground surface; and withdrawing the wireline and tool from the well by spooling the wireline onto the drum and recovering the tool in the lubricator.

10. Electrically conductive slick line apparatus for use in wells comprising:

a metal tube having a welded seam and an outside diameter and wall thickness selected to form a tube sufficiently flexible to coil on a slick line drum; and an electrical conductor having insulation, the insulation having an outside diameter and extending coextensively through the bore of the metal tube, the bore of the metal tube having a larger diameter than the outside diameter of the insulation of the conductor such that an annular space is formed between the insulated conductor and the metal tube, the insulated conductor being in a helically coiled condition and in frictional contact with the inside wall of the metal tube so as to restrain the conductor from falling in the tube.

11. The apparatus of claim 10 wherein the outside diameter of the tube is about ⅛ inch.

12. The apparatus of claim 10 wherein the wall thickness of the tube is about 0.022 inch.

13. The apparatus of claim 10 wherein the insulation of the conductor is a polymer.

14. The apparatus of claim 13 wherein the polymer is a polyimide.

15. The apparatus of claim 10 wherein the diameter of the insulated conductor is about 0.055 inch.

16. A conductor wire line for use with slick line equipment in wells comprising:

a metal tube having an outside diameter and wall thickness and having an insulated conductor provided in a helically coiled condition, said outside diameter and wall thickness selected such that the metal tube is sufficiently flexible to coil on a slick line drum. The insulated conductor having a diameter and extending coextensively through the metal tube, the metal tube being formed from a strip of flat material and welded while simultaneously feeding the insulated conductor thereinto and thereafter being decreased in diameter by drawing the tube to a final inside diameter, the final inside diameter being greater than the diameter of the insulated conductor such that an annular space is formed between the insulated conductor and the metal tube, the helically coiled insulated conductor being in frictional contact with the metal tube.

17. The conductor wire line of claim 16 wherein the drawing of the tube decreases the final outside diameter to about ⅛b 54974977.001 inch.

18. A method for manufacturing a metal tube for use with slick line equipment and having an insulated conductor disposed therein comprising:

providing a strip of flat material and forming the material into the metal tube while simultaneously feeding an insulated conductor having a diameter thereinto, the insulated conductor being provided in a helically coiled condition;

welding the material of the metal tube while protecting the insulated conductor from the heat of the welding process; and drawing the tube so as to decrease the diameter of the metal tube such that the metal tube has an outside diameter, an inside diameter, and a wall thickness determined from said outside and inside diameters, said outside diameter and wall thickness selected such that the metal tube is sufficiently flexible to coil on a slick line drum, and said inside diameter being greater than said insulated conductor diameter, wherein an annular space is formed between the insulated conductor and the metal tube, and wherein the helically coiled insulated conductor is in frictional contact with the metal tube wall.

* * * * *